(12) United States Patent
Nichols

(10) Patent No.: US 12,281,790 B2
(45) Date of Patent: Apr. 22, 2025

(54) STRUCTURAL AND LIGHTING SYSTEM

(71) Applicant: AVID Labs, LLC, Fort Wayne, IN (US)

(72) Inventor: Joel A. Nichols, Columbia City, IN (US)

( * ) Notice: Subject to any disclaimer, the term of this patent is extended or adjusted under 35 U.S.C. 154(b) by 771 days.

(21) Appl. No.: 16/831,978

(22) Filed: Mar. 27, 2020

(65) Prior Publication Data

US 2020/0309345 A1 Oct. 1, 2020

Related U.S. Application Data

(60) Provisional application No. 62/826,378, filed on Mar. 29, 2019.

(51) Int. Cl.
| | |
|---|---|
| *F21V 7/04* | (2006.01) |
| *A01G 7/04* | (2006.01) |
| *A01G 9/14* | (2006.01) |
| *A01G 9/24* | (2006.01) |
| *F21Y 115/10* | (2016.01) |

(52) U.S. Cl.
CPC ............. *F21V 7/041* (2013.01); *A01G 7/045* (2013.01); *A01G 9/14* (2013.01); *A01G 9/249* (2019.05); *F21Y 2115/10* (2016.08)

(58) Field of Classification Search
CPC .......... A01G 9/249; A01G 9/14; A01G 7/045; F21V 7/041
See application file for complete search history.

(56) References Cited

U.S. PATENT DOCUMENTS

| | | | | |
|---|---|---|---|---|
| 4,196,544 A | * | 4/1980 | Davis ..................... | A01G 9/249 47/17 |
| 4,290,242 A | * | 9/1981 | Gregory, Jr. ........... | A01G 9/225 52/2.17 |
| 4,992,917 A | * | 2/1991 | Earnshaw .............. | A01G 7/045 362/346 |
| 4,996,791 A | * | 3/1991 | Sprung ................... | A01G 9/14 47/17 |
| 5,025,356 A | * | 6/1991 | Gawad ................... | A01G 9/249 362/221 |
| 5,261,184 A | * | 11/1993 | Appeldorn ............. | A01G 9/222 47/17 |
| 6,042,250 A | * | 3/2000 | Stragnola ............... | A01G 9/249 362/346 |
| 6,131,363 A | * | 10/2000 | Phillips ................. | A01G 9/1438 52/786.11 |
| 8,523,385 B2 | * | 9/2013 | Lu .......................... | H05B 45/10 362/231 |
| 9,404,636 B1 | * | 8/2016 | Engberg ................. | F21S 8/08 |
| 9,781,884 B1 | * | 10/2017 | Iwai ........................ | H02S 40/20 |
| 10,941,927 B1 | * | 3/2021 | Yang ...................... | F21V 21/38 |
| 11,083,140 B1 | * | 8/2021 | Hughes ................. | H05B 45/20 |
| 2018/0352755 A1 | * | 12/2018 | Szoradi ................. | A01G 9/20 |
| 2019/0165221 A1 | * | 5/2019 | Amiya .................. | C09K 11/0883 |

* cited by examiner

*Primary Examiner* — Joshua D Huson
*Assistant Examiner* — Edgar Reyes

(57) ABSTRACT

A structural lighting system including a structural member having an outward facing portion and an inward facing portion. The structural member being configured to support a light transmissive environmental barrier. The outward facing portion of the structural member having a reduced light blocking shape as compared to the inward facing portion. A light source is coupled to the structural member, the light source being arranged to emit light from the inward facing portion.

20 Claims, 5 Drawing Sheets

STRUCTURAL AND LIGHTING SYSTEM

CROSS REFERENCE TO RELATED APPLICATIONS

This is a non-provisional application based upon U.S. provisional patent application Ser. No. 62/826,378, entitled "STRUCTURAL AND LIGHTING SYSTEM", filed Mar. 29, 2019, which is incorporated herein by reference.

BACKGROUND OF THE INVENTION

1. Field of the Invention

The present invention relates to a lighting system that is part of a structural member of a building, such as a greenhouse.

2. Description of the Related Art

A Light Emitting Diode (LED) Strip Light (also known as an LED tape, a tape light or ribbon light) is generally a linear flexible circuit board populated by surface mounted devices (SMD) in the form of LEDs and other components that often come with an adhesive backing. Originally, strip lights were used solely in accent lighting, backlighting, task lighting, and decorative lighting applications. With the increased luminous efficacy of higher-power LEDs, strip lights are now used in applications such as high brightness task lighting, and as fluorescent and halogen lighting fixture replacements, particularly for use in the growing of plants in greenhouses.

Tape light is widely available and becoming a common commodity product in the LED lighting industry. The product is both cost effective and easy to install. The product is very versatile and can be cut to the correct length with ease and no additional tools. Tape light is available in indoor configurations, weather and waterproof versions, color changing versions and comes in variable widths normally between 8 and 15 mm.

Securing tape light is usually achieved using an adhesive backing with a cover that is removed and the product stuck down to the end use item. In certain situations, a mechanical means of securing is required, in these instances the tape light is normally held down using a crimp that straddles the top of the tape. In yet another instance a cover and channel may be used to secure the tape. Some projects require all three. The flexibility of using this lighting with various other elements lends itself to new applications.

What is needed in the art is a way to allow the use of strip lighting to form a light system that can be manufactured in an economic manner, allowing the combination of lighting for the efficient positioning in association with elements of buildings.

SUMMARY OF THE INVENTION

Embodiments of the present invention are directed to a lighting system for use with greenhouse structural members.

The invention in one form is directed to a structural lighting system including a structural member having an outward facing portion and an inward facing portion. The structural member being configured to support a light transmissive environmental barrier. The outward facing portion of the structural member having a reduced light blocking shape as compared to the inward facing portion. A light source is coupled to the structural member, the light source being arranged to emit light from the inward facing portion.

The invention in another form is directed to a greenhouse structure including a light transmissive environmental barrier, and a plurality of structural members that support the light transmissive environmental barrier. The structural members have an outward facing portion and an inward facing portion, the outward facing portion having a reduced light blocking shape as compared to the inward facing portion. There is a light source coupled to the structural member, the light source being arranged to emit light from the inward facing portion.

Advantageously, the present invention provides a lighting system that is associated with a building structural member.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
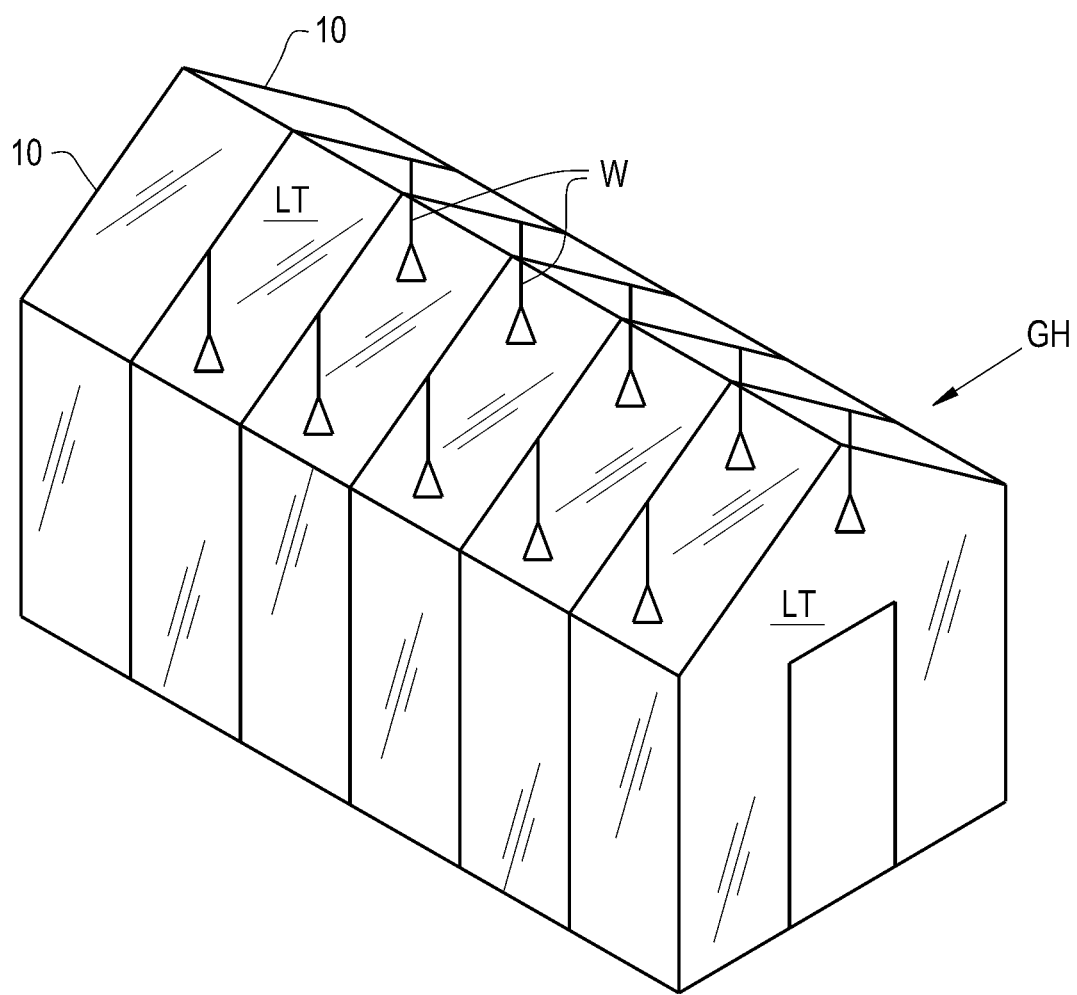
FIG. 1 is a perspective view of a greenhouse using an embodiment of a structural lighting system of the present invention.

Referring now to the drawings, and more particularly to FIG. 1, there is shown a greenhouse structure GH that includes a light transmissive environmental barrier LT, which can be in the form of glass LT, polycarbonate panels LT or a light transmissive film LT. Structural members 10 support the light transmissive environmental barrier LT, to form the outer skin or surface of greenhouse GH. Other internal elements W of greenhouse GH may be internally mounted to structural members 10. Elements W may be in the form of watering devices that incidentally may be supplied from members 10.

Figure 2A:
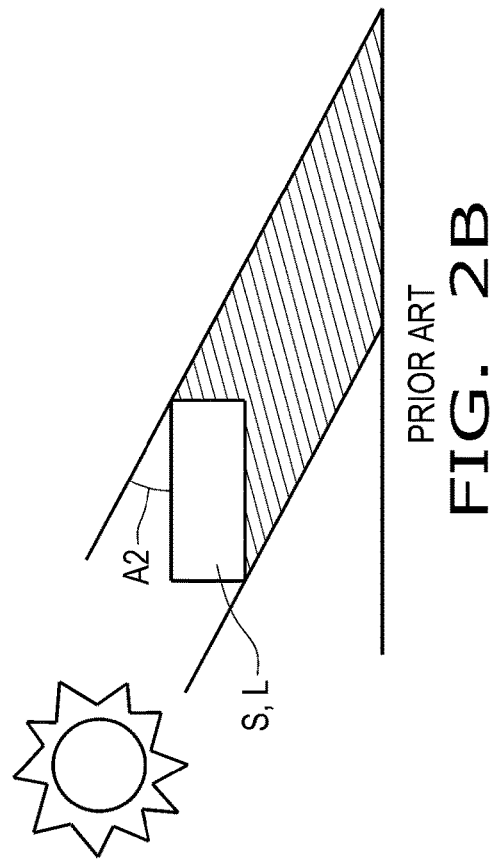
FIG. 2A illustrates a prior art structural member used in a greenhouse showing how sunlight is blocked at a specific elevation of the sun.
Figure 2B:
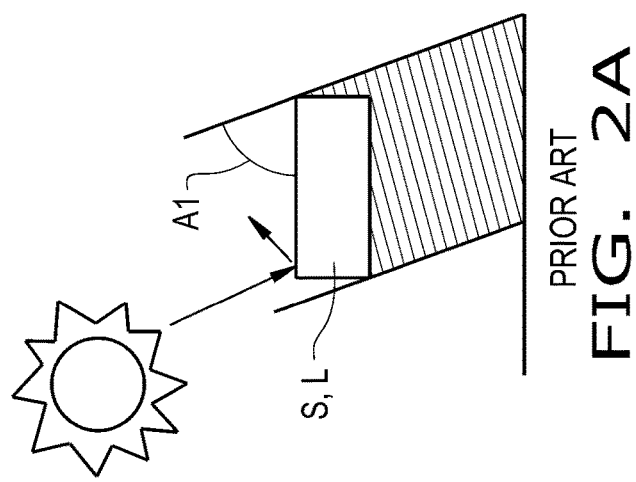
FIG. 2B illustrates the prior art structural member of FIG. 2A showing how sunlight is blocked at a different specific elevation of the sun.
Figure 2D:
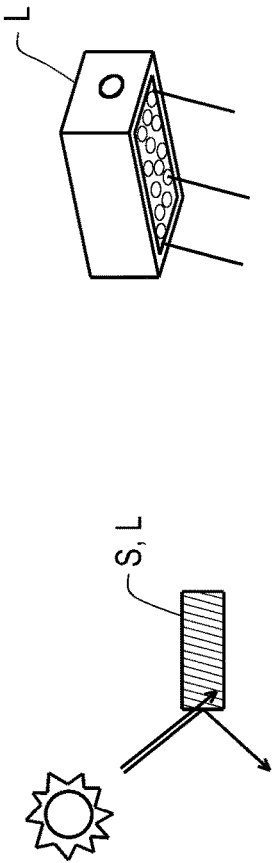
FIG. 2D illustrates that structural members and light fixtures typically reflect or absorb the light from the sun.
Figure 2C:
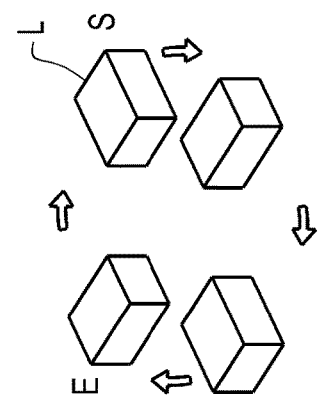
FIG. 2C illustrates a prior art structural member used in a greenhouse showing how sunlight is blocked due to orientations of structural materials used in a greenhouse.
Figure 2E:
FIG. 2E illustrates that light fixtures are typically separately considered when a greenhouse is designed and constructed.

Now, additionally referring to FIGS. 2A-2E there is illustrated a series of issues or problems that exist in the prior art, and are overcome with the present invention, relative to structural and lighting members used in a greenhouse. When structural members S or lighting members L are used in greenhouses they actually block part of the light from the sun. This blocking can take the form of absorption of the light thereby converting it to heat, or reflection, which can be directed in an undesirable direction, such as back outward from the greenhouse. For example, in FIG. 2A, structural member S or lighting member L has sunlight that is reflected, as illustrated with the arrows, and light at angle A1 is effectively blocked from reaching plants therebelow. FIG. 2B illustrates that when the sun is at angle A2 even more sunlight is blocked due to structure S or light fixture L. FIG. 2C illustrates that the orientation of members S or L relative to, for example, the east direction E will impact the blockage of sunlight in a greenhouse. FIG. 2D represents two aspects of sunlight hitting member S or L, in that it is generally reflected or absorbed the member S or L. FIG. 2E illustrates that the prior art has treated lighting solutions separate from the structural aspects of a greenhouse.

Figure 3A:
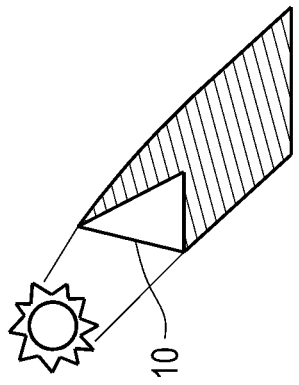
FIG. 3A illustrates one embodiment of a cross-sectional shape of a structural member of the present invention with blockage of the sunlight at a specific elevation of the sun.
Figure 3B:
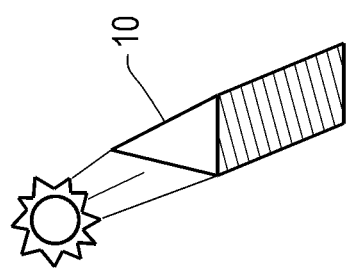
FIG. 3B illustrates the structural member of FIG. 3A showing how sunlight is blocked at a different specific elevation of the sun.
Figure 3C:
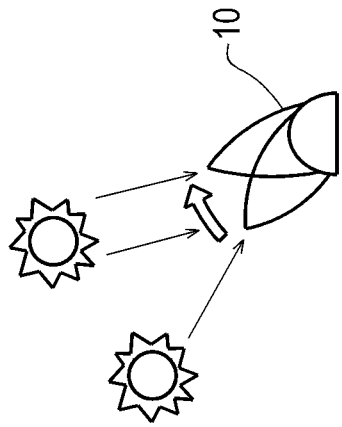
FIG. 3C illustrates another embodiment of the structural lighting system of the present invention having a moving or rotating portion to adjust to a solar elevation.

In the present invention these issues are considered in order to minimize the negative aspects of structural and lighting members to maximize the amount of sunlight that is useful to the plants in the greenhouse GH. For example, in FIGS. 3A and 3B, the use of low shadow profiles, the orientation of the lights, consideration of seasonal movements of the members and proper oriented surfaces to reflect and/or allow passage of the sunlight are considered. Also in FIG. 3C an active movable, or flexible portion of structural member 10 is illustrated.

Figure 4A:
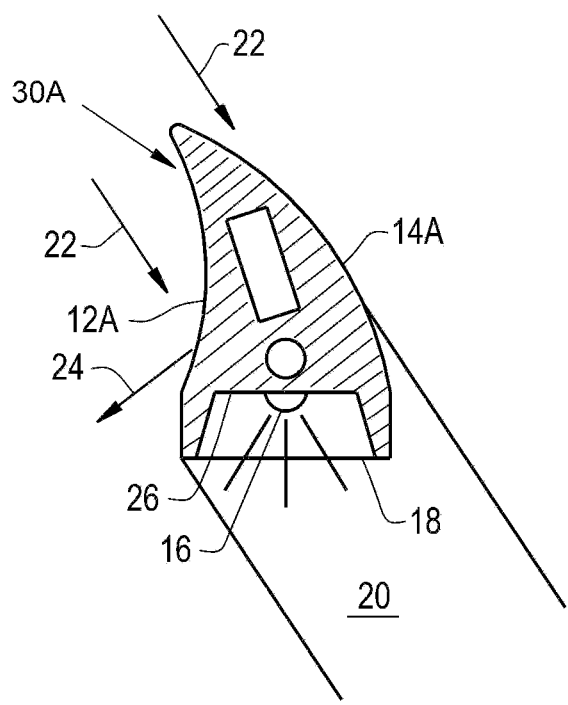
FIG. 4A illustrates another embodiment of a cross-sectional shape of the structural member of the present invention.
Figure 4B:
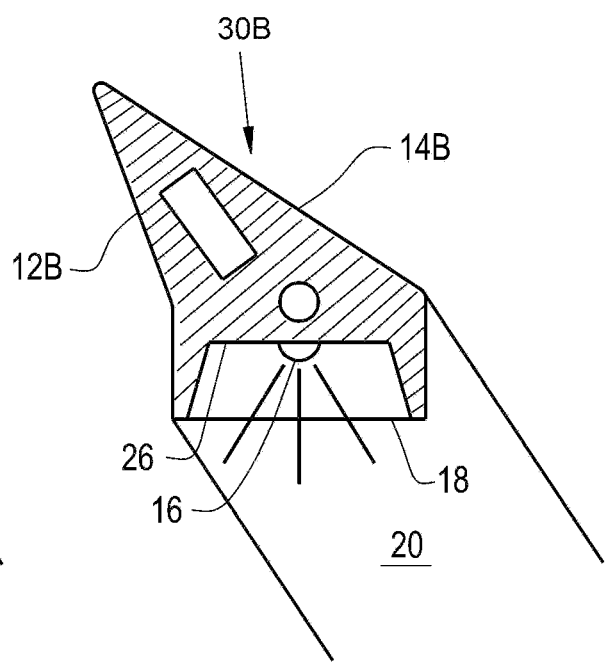
FIG. 4B illustrates yet another embodiment of a cross-sectional shape of the structural member of the present invention.
Figure 4C:
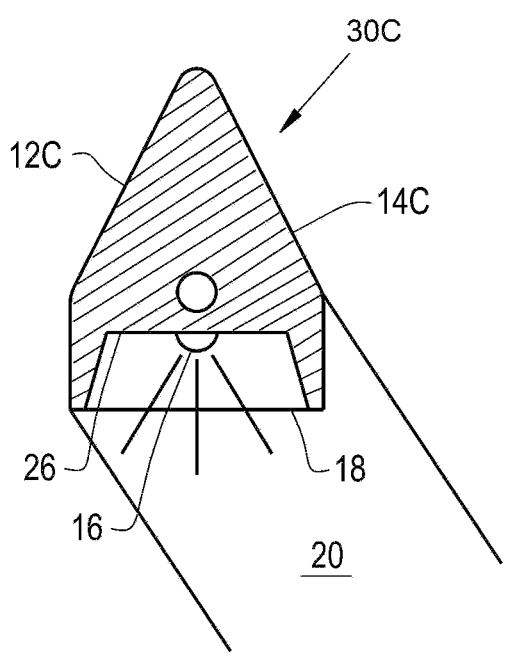
FIG. 4C illustrates still another embodiment of a cross-sectional shape of the structural member of the present invention.

Now additionally referring to FIGS. 4A-4C, the structural members 10A, 10B and 10C have outward facing portions 12A, 14A, 12B, 14B, 12C, 14C and an inward facing portion 18, the outward facing portions 12A, 14A, 12B, 14B, 12C, 14C having a reduced light blocking shape as compared to the inward facing portion 18. The light blocking area is represented by area 20. Further, outward facing portions 12A, 12B, 12C are oriented toward and parallel with the equator in order to reflect incident sunlight 22 toward the interior of greenhouse GH, in the form of reflected light 24. The angle of outward facing portions 14A, 14B, 14C is selected so that light there will be reflected at a shallow angle so that the light will continue towards greenhouse GH.

A light source 16 coupled to the structural member 10, the light source being arranged to emit light from the inward facing portion 20. Outward facing portions 12A, 14A, 12B, 14B, 12C, 14C are shaped to reflect sunlight at a downward angle, the outward facing portions 12A, 14A, 12B, 14B, 12C, 14C being oriented in a building structure GH to reduce an outward reflectance of sunlight. Light source 16 is coupled to bottom portion 18 and may be positioned in a recess 26 in bottom portion 18 of structural member 10. Outward facing portions 12A, 14A, 12B, 14B, 12C, 14C being shaped to substantially reflect sunlight at a downward angle 24.

Structural member 10 has a longitudinal length (as illustrated in FIG. 1) that is oriented approximately parallel to an East-West direction. Outward facing portions 12A, 14A, 12B, 14B, 12C, 14C are angled or curved along the longitudinal length so as to reflect sunlight into structure GH in which structural member 10 is a part. Light source 16 is integral with the structural member 10. Further, light transmissive environmental barrier LT has a refractive index, the structural member having an angled surface 12A, 14A, 12B, 14B, 12C, 14C that in combination with the refractive index directs sunlight at a downward angle.

Systems 30A, 30B, and 30C, each having surfaces 12 and 14 and a light source 16. Systems 30A, 30B, and 30C can also be structural members 30A, 30B, and 30C that hold the outer skin LT of greenhouse GH in position, and happen to have lights 16 in portions of their extent. Surfaces 12A, 12B and 12C are oriented toward the South (in the Northern hemisphere) and use some of the characteristics mentioned herein maximize the passage of sunlight to plants in the greenhouse GH. For example, surface 12B is oriented and angled to reflect light from the sun into the greenhouse, and surface 14B is oriented generally toward the North so that its angle reduces the profile encountering solar radiation and/or cause reflected radiation to then encounter the skin of the greenhouse and be reflected therefrom back into the greenhouse.

Figure 5A:
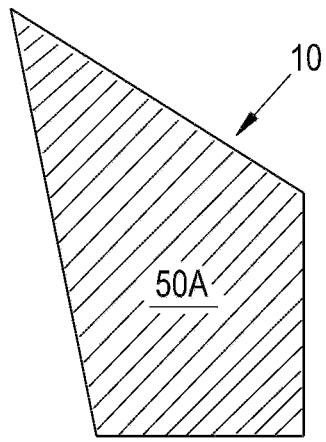
FIG. 5A illustrates still yet another embodiment of a cross-sectional shape of the structural member of the present invention.
Figure 5B:
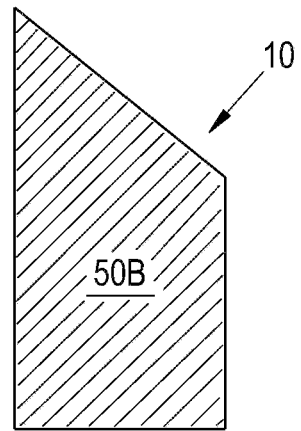
FIG. 5B illustrates still yet another embodiment of a cross-sectional shape of the structural member of the present invention.
Figure 5C:
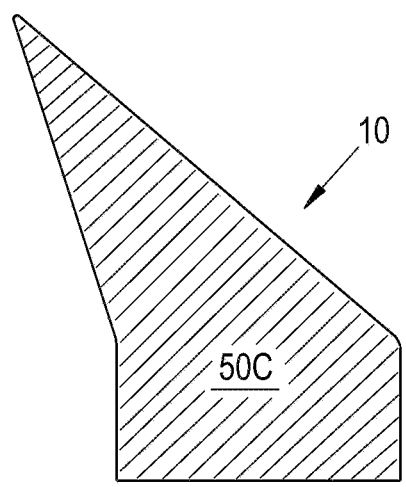
FIG. 5C illustrates still yet another embodiment of a cross-sectional shape of the structural member of the present invention.

Now, additionally referring to FIGS. 5A-5C, there are shown profiles 50A, 50B and 50C that can be used as structural members 10 and/or light members. These profiles are similar to the previous ones discussed, in that they have reflective surfaces and orientations that minimize the encounter with the flow of sunlight. These members are oriented such that they would have a longitudinal axis that generally aligns with the east-west direction, with the right sides of the profiles facing North and the left sides facing South.

It is also contemplated to have transparent or translucent elements along portions of the surfaces, as desired, to couple the skin of the greenhouse thereto and to conduct light so that it is directed to the interior of the greenhouse GH.

The angles and shapes of the members 10 are selected to maximize strength for the members as they are positioned and assembled, and to, as previously mentioned, maximize the amount of sunlight reaching the interior of greenhouse GH.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A structural lighting system of a greenhouse, comprising:
a structural support member having a longitudinal length and at least two outward sides and an inward side, the structural support member being configured to support an outer light transmissive environmental barrier of a greenhouse, the at least two outward sides having a reduced light blocking shape as compared to the inward side; and
a light source coupled to the structural support member, the light source being arranged to emit light from the inward side.

2. The structural lighting system of claim 1, wherein:
at least one of the outward sides is shaped to reflect sunlight at a downward angle.

3. The structural lighting system of claim 2, wherein:
at least one of the outward sides is oriented in a building structure to reduce an outward reflectance of sunlight.

4. The structural lighting system of claim 1, wherein:
the light source is coupled to the inward side of the structural support member.

5. The structural lighting system of claim 1, wherein:
the light source is positioned in a longitudinal recess in the inward side of the structural support member along at least a portion of its longitudinal length.

6. The structural lighting system of claim 1, wherein:
the light source is positioned in a longitudinal recess in the inward side of the structural support member along at least a portion of its longitudinal length, at least one of the outward sides being shaped to substantially reflect sunlight at a downward angle.

7. The structural lighting system of claim 6, wherein:
the longitudinal length of the structural support member is oriented approximately parallel to an East-West direction.

8. The structural lighting system of claim 7, wherein:
at least one of the outward sides is angled or curved along the longitudinal length so as to reflect sunlight into a structure in which the structural support member is a part of.

9. The structural lighting system of claim 1, wherein:
the light source is integral with the structural support member.

10. The structural lighting system of claim 9, wherein;
the light transmissive environmental barrier is supported on the outward sides of the structural support member.

11. The structural lighting system of claim 10, wherein:
the light transmissive environmental barrier has a refractive index, at least one outward side of the structural support member having an angled surface that in combination with the refractive index directs sunlight at a downward angle.

12. A greenhouse structure, comprising:
a light transmissive environmental barrier;
a plurality of structural support members having a longitudinal length that support the light transmissive environmental barrier, the structural support members having at least two outward sides and an inward side, the at least two outward sides having a reduced light blocking shape as compared to the inward side; and
a light source coupled to the structural support member, the light source being arranged to emit light from the inward side.

13. The greenhouse structure of claim 12, wherein;
at least one of the outward sides is shaped to reflect sunlight at a downward angle, the outward sides being oriented in a greenhouse structure to reduce an outward reflectance of sunlight.

14. The greenhouse structure of claim 12, wherein:
the light source is coupled to the inward side of the structural support member.

15. The greenhouse structure of claim 12, wherein:
the light source is positioned in a longitudinal recess in the inward side of the structural support member along at least a portion of its longitudinal length.

16. The greenhouse structure of claim 12, wherein:
the light source is positioned in a longitudinal recess in the inward side of the structural support member along at least a portion of its longitudinal length, at least one of the outward sides being shaped to substantially reflect sunlight at a downward angle.

17. The greenhouse structure of claim 16, wherein:
the longitudinal length of the structural support member has a longitudinal length that is oriented approximately parallel to an East-West direction.

18. The greenhouse structure of claim 17, wherein:
at least one of the outward sides is angled or curved along the longitudinal length so as to reflect sunlight into a structure in which the structural support member is a part of.

19. The greenhouse structure of claim 18, wherein:
the light source is integral with the structural support member.

20. The greenhouse structure of claim 12, wherein:
the light transmissive environmental barrier has a refractive index, at least one outward side of the structural support member having an angled surface that in combination with the refractive index directs sunlight at a downward angle.

* * * * *